United States Patent
Gunderson et al.

(10) Patent No.: US 7,019,942 B2
(45) Date of Patent: Mar. 28, 2006

(54) ELECTRICAL FEEDTHROUGH IN A HERMETICALLY SEALED DATA STORAGE DEVICE

(75) Inventors: Neal F. Gunderson, Lake Elmo, MN (US); Wolfgang Rosner, Burnsville, MN (US)

(73) Assignee: Seagate Technology LLC, Scotts Valley, CA (US)

(*) Notice: Subject to any disclaimer, the term of this patent is extended or adjusted under 35 U.S.C. 154(b) by 13 days.

(21) Appl. No.: 10/782,295

(22) Filed: Feb. 19, 2004

(65) Prior Publication Data

US 2004/0252407 A1 Dec. 16, 2004

Related U.S. Application Data

(60) Provisional application No. 60/448,229, filed on Feb. 19, 2003.

(51) Int. Cl.
    *G11B 5/127* (2006.01)
(52) U.S. Cl. .................................................... 360/125
(58) Field of Classification Search ................. None
    See application file for complete search history.

(56) References Cited

U.S. PATENT DOCUMENTS

| | | | |
|---|---|---|---|
| 3,786,559 A * | 1/1974 | Smith | .................. 228/115 |
| 4,367,503 A | 1/1983 | Treseder | |
| 4,488,192 A | 12/1984 | Treseder | |
| 4,556,969 A | 12/1985 | Treseder | |
| 5,193,046 A * | 3/1993 | Lemke et al. | ............ 360/97.02 |
| 5,317,462 A | 5/1994 | Kakizaki | |
| 5,422,766 A | 6/1995 | Hack | |
| 5,454,157 A | 10/1995 | Ananth | |
| 5,671,103 A | 9/1997 | Tada | |
| 5,696,648 A | 12/1997 | Jeong | |
| 6,144,178 A | 11/2000 | Hirano | |
| 6,178,059 B1 | 1/2001 | Frees | |
| 6,317,286 B1 | 11/2001 | Murphy | |
| 6,373,654 B1 | 4/2002 | Iwahara | |
| 6,392,838 B1 | 5/2002 | Hearn | |
| 6,430,000 B1 | 8/2002 | Rent | |
| 6,525,899 B1 | 2/2003 | Hearn | |
| 6,622,046 B1 * | 9/2003 | Fraley et al. | .................. 607/36 |
| 2002/0044376 A1 | 4/2002 | Serizawa | |
| 2002/0089782 A1 | 7/2002 | Hearn | |
| 2002/0114104 A1 | 8/2002 | Hearn | |
| 2002/0153672 A1 | 10/2002 | Caplain | |

* cited by examiner

*Primary Examiner*—George Letscher
(74) *Attorney, Agent, or Firm*—Fellers, Snider, et al.

(57) ABSTRACT

An electrical feedthrough is provided to establish an electrical conduction path from an interior of a hermetically sealed housing to an exterior environment. The feedthrough comprises an elongated electrically conductive pin having opposing proximal and distal ends and a medial portion configured to be supported within a corresponding aperture in a first housing member. A first cantilevered spring contact is affixed to and projects from a selected one of the proximal and distal ends of the pin. Preferably, a second cantilevered spring contact is further affixed to and projects from the remaining one of the proximal and distal ends of the pin. A plurality of feedthroughs are preferably affixed through an insertion member to form a feedthrough assembly which is then affixed adjacent an aperture in the first housing member. An insulating member in the plate preferably supports and isolates a pair of the pins to transmit a differential signal.

27 Claims, 10 Drawing Sheets

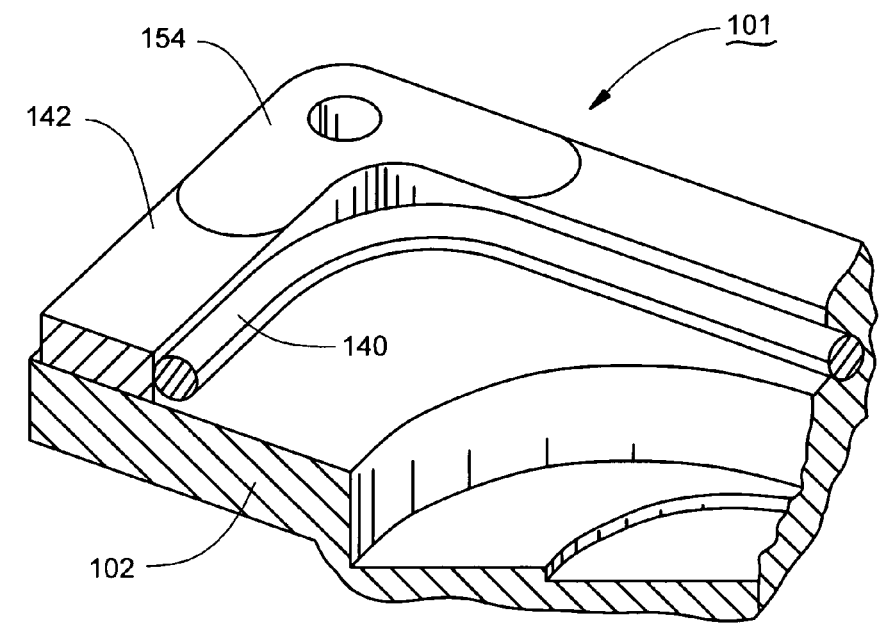
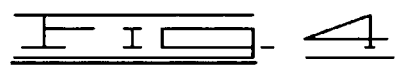
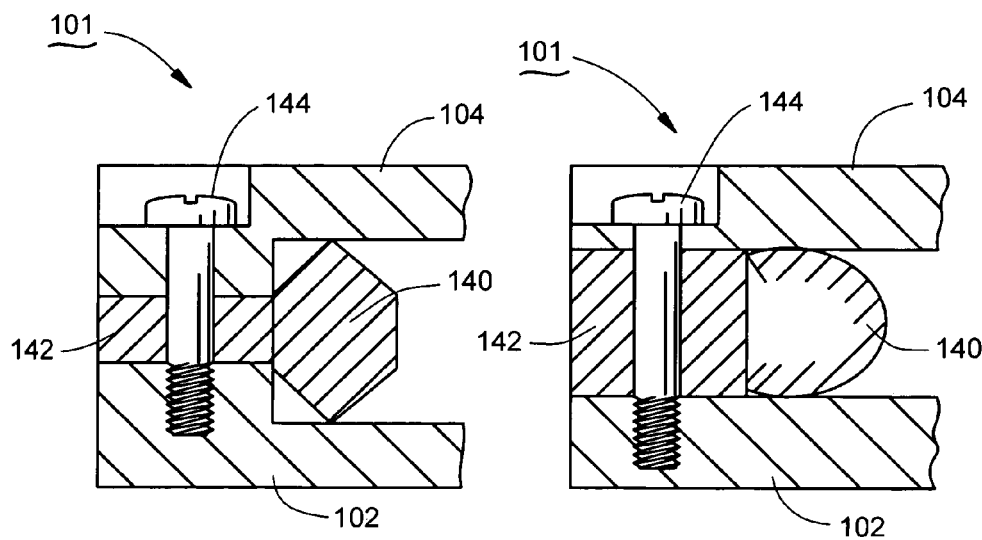

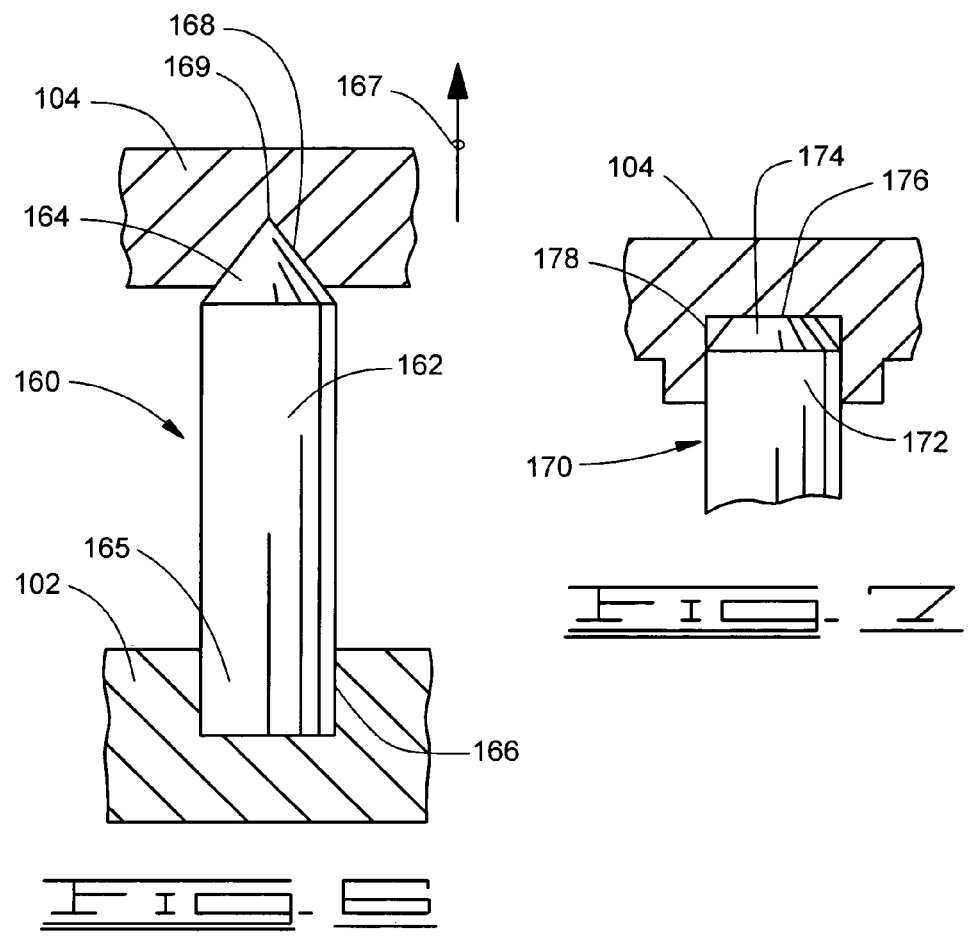
FIG. 6
FIG. 7
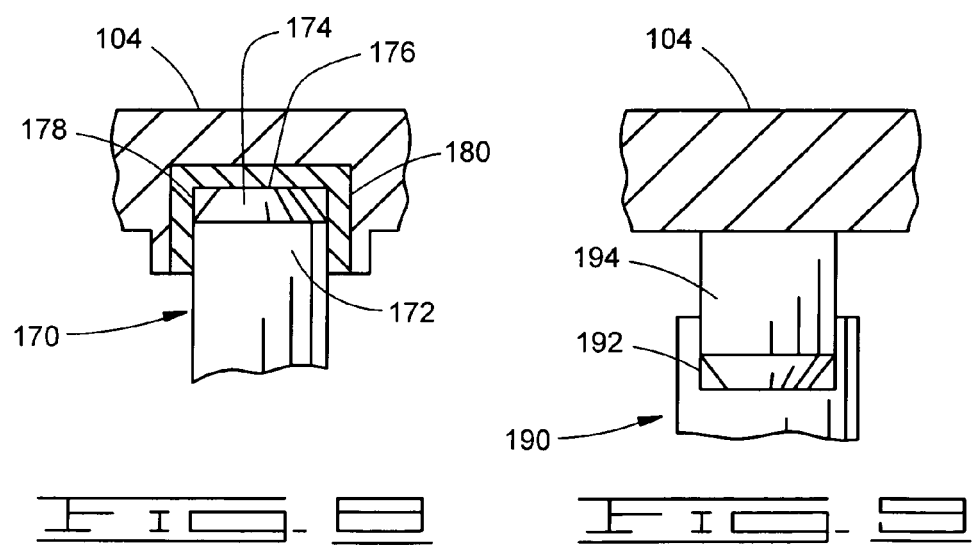
FIG. 8
FIG. 9

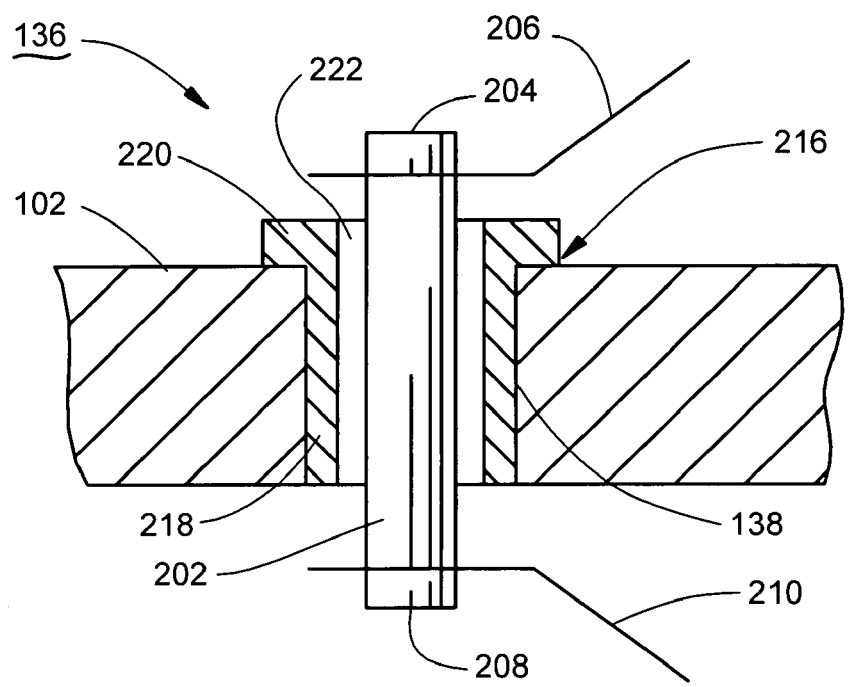
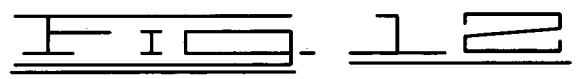
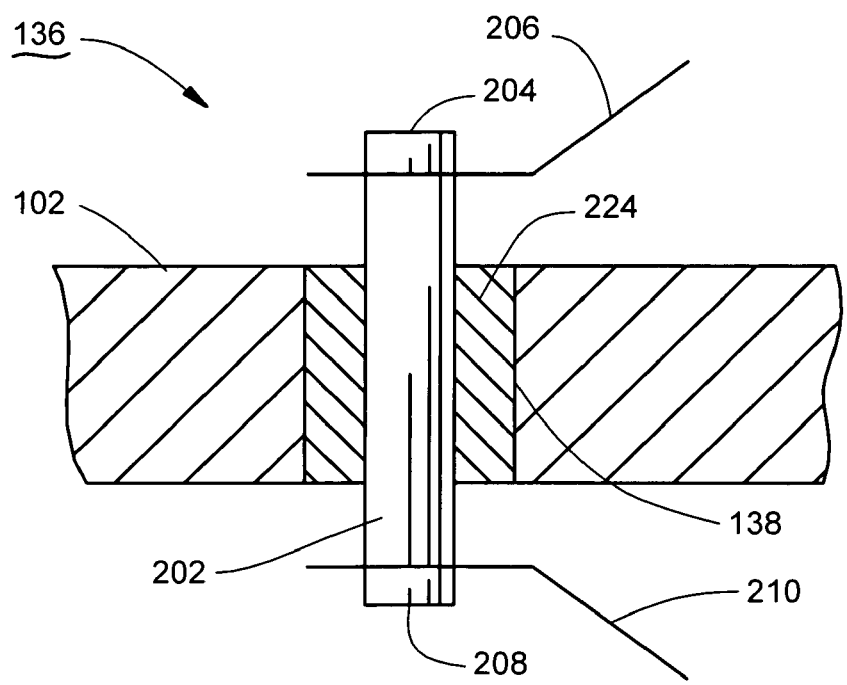
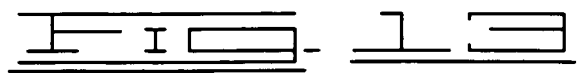

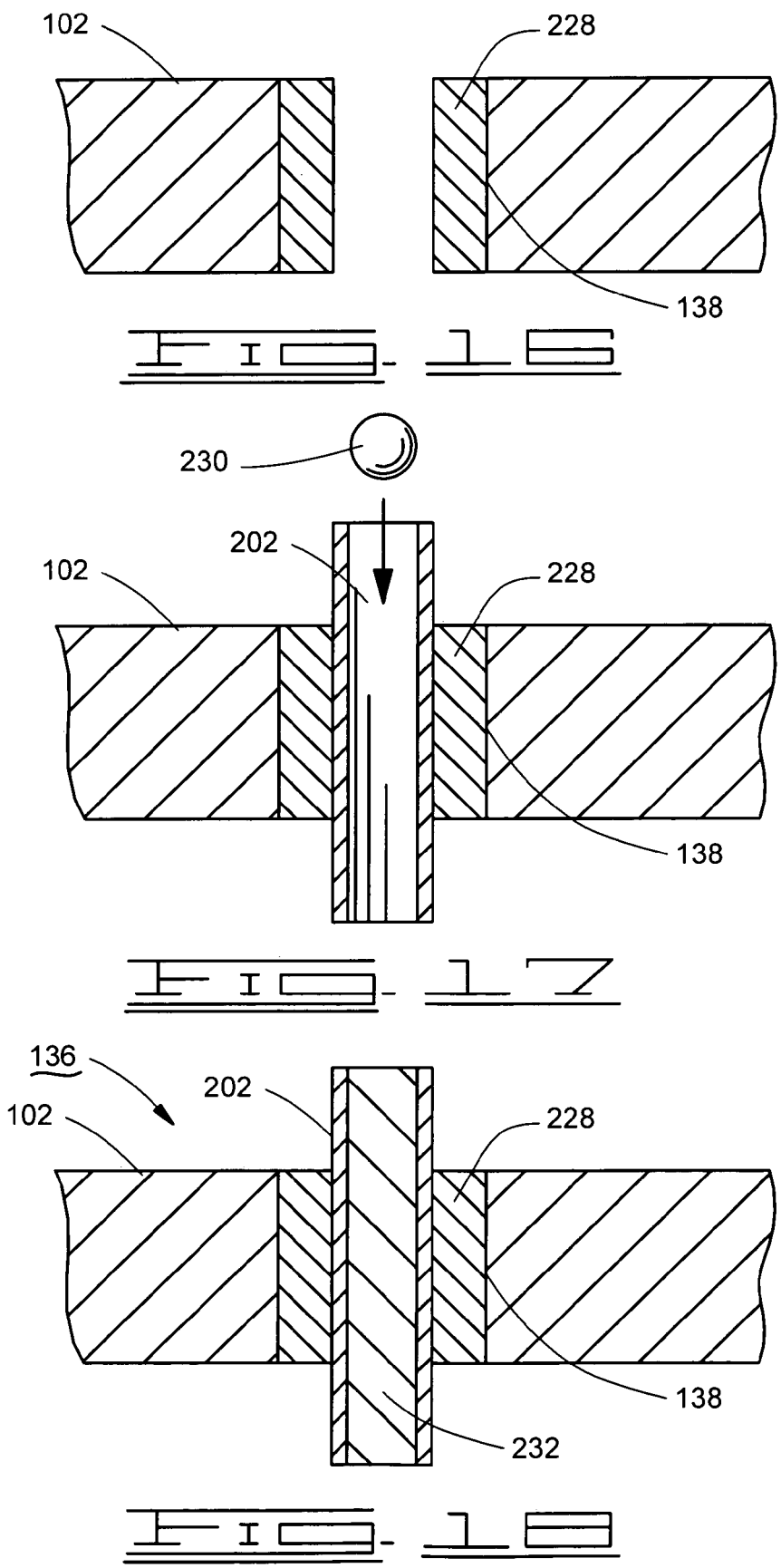

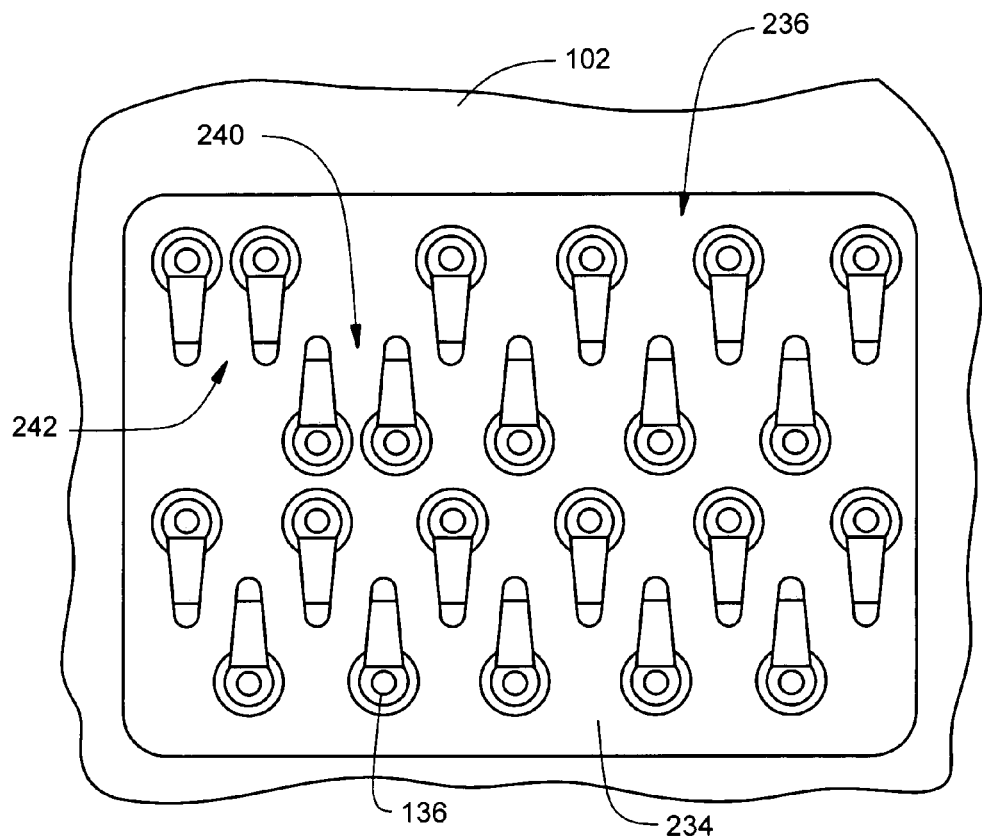
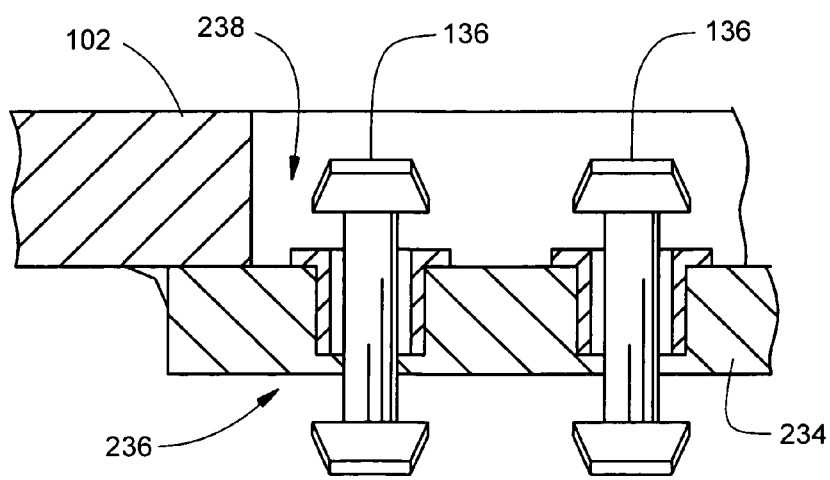
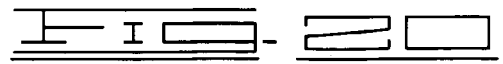

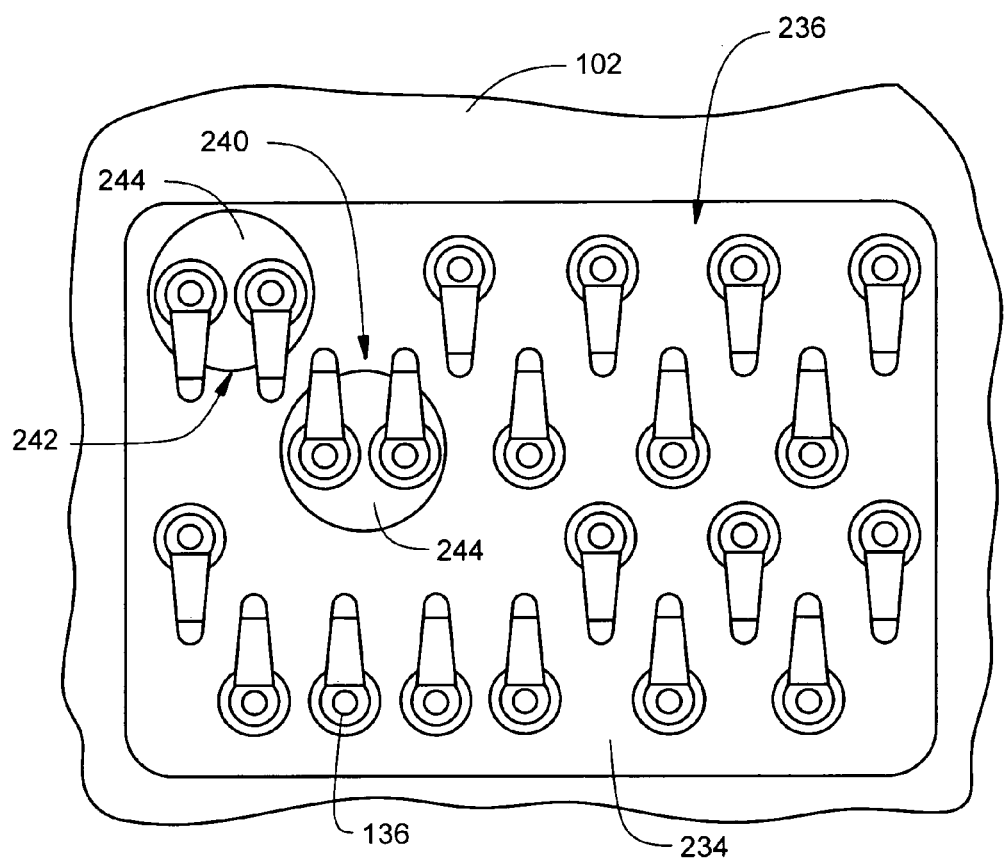
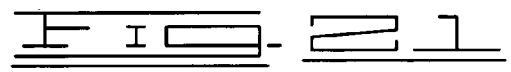
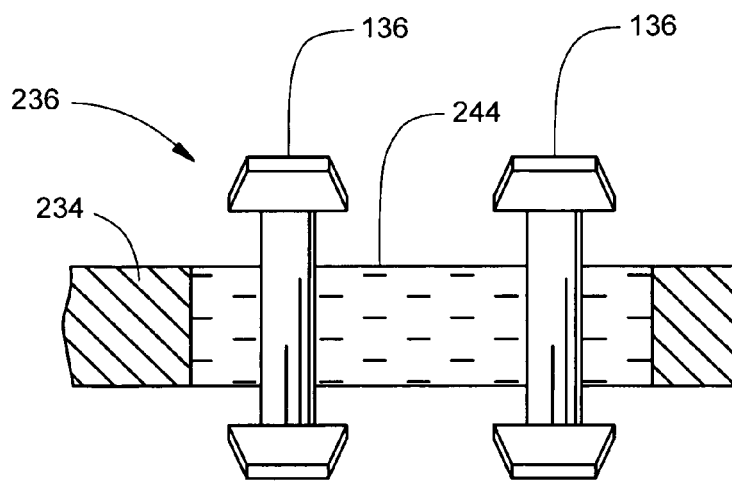
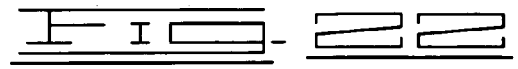

ELECTRICAL FEEDTHROUGH IN A HERMETICALLY SEALED DATA STORAGE DEVICE

RELATED APPLICATIONS

The present application claims benefit of U.S. Provisional Application No. 60/448,229, filed Feb. 19, 2003 and is related to copending U.S. patent application Ser. No. 10/782,294 entitled Hermetically Sealed Data Storage Device, and to copending U.S. patent application Ser. No. 10/782,298 entitled Internal Member Support in a Hermetically Sealed Data Storage Device, both filed concurrently herewith.

FIELD OF THE INVENTION

The claimed invention relates generally to the field of hermetically sealed housings and more particularly, but not by way of limitation, to providing one or more electrical feedthroughs through a wall of a housing such as used in a data storage device.

BACKGROUND

Disc drives are digital data storage devices which store and retrieve large amounts of user data in a fast and efficient manner. The data are magnetically recorded on the surfaces of one or more data storage discs (media) affixed to a spindle motor for rotation at a constant high speed.

An array of vertically aligned data transducing heads are controllably positioned by an actuator to read data from and write data to tracks defined on the recording surfaces. An actuator motor rotates the actuator to move the heads across the disc surfaces. The heads are configured to be aerodynamically supported over these surfaces by fluidic pressures (e.g., air, helium, etc.) established by the high speed rotation of the discs.

It is generally desirable to control the fluidic environment within a data storage device. Data storage housings are typically sealed with gaskets and similar features along the respective housing mating surfaces to prevent the ingress of contaminants from the external environment.

Some designers have provided hermetically sealed devices so that the interior atmosphere within the device is completely captured and no fluidic transfer is allowed to occur between the interior and exterior of the housing. A hermetically sealed housing allows the use of a lower density fluid within the housing, such as an inert gas (e.g., helium). This can provide certain operational performance advantages including lower head fly heights, reduced non-repeatable runout (NRRO) effects, and higher data recording densities. A hermetically sealed housing can also reduce corrosion of internal components and contamination from external particles.

There is accordingly a need for improvements in the hermetically sealed housing configurations, such as a housing of a data storage device, and it is to such improvements that the claimed invention is generally directed.

SUMMARY OF THE INVENTION

In accordance with preferred embodiments, a hermetically sealed housing is provided such as for use in a data storage device.

The housing is formed of opposing, substantially planar first and second housing members coupled together to form a hermetically sealed interior environment. At least one electrical feedthrough is used to establish an electrical conduction path from the interior environment within the housing to an exterior environment outside the housing.

Preferably, the electrical feedthrough comprises an elongated electrically conductive pin having a proximal end configured to project into the interior environment, a distal end configured to project into the exterior environment, and a medial portion configured to be supported within a corresponding aperture in the first housing member. A variety of processes can be used to affix the pin in the aperture in the first housing member, including fusing, molding-in-place, thermal shrinking, and swaging.

The feedthrough further preferably comprises a cantilevered spring contact affixed to and which projects from a selected one of the proximal and distal ends of the pin. The feedthrough further preferably comprises a second cantilevered spring contact affixed to and which projects from the remaining one of the proximal and distal ends of the pin.

In accordance with some preferred embodiments, the feedthrough further comprises a ring of low permeable, insulative material which abuttingly surrounds the medial portion of the pin. The feedthrough further preferably comprises a ring of conductive material which abuttingly surrounds the ring of insulative material, wherein the ring of conductive material is attached to the first housing member to form a localized hermetic seal. A hat flange can be advantageously used to extend from the ring of conductive material to facilitate the fusing of the feedthrough to the first housing member.

In other preferred embodiments, the pin is characterized as a hollow, cylindrical tube to permit a swaging operation to affix the pin within the aperture in the first housing member. Solder or other low permeable material is thereafter placed within the hollow, cylindrical tube to seal the feedthrough.

In yet additional preferred embodiments, a plurality of nominally identical feedthroughs project through the first member to establish a corresponding plurality of individual electrically conductive paths. The feedthroughs can be individually affixed in corresponding apertures in the first housing member. Alternatively, the feedthroughs can be affixed to an insertion member, such as an insertion plate, which is then affixed over an aperture in the first housing member.

These and various other features and advantages which characterize the claimed invention will become apparent upon reading the following detailed description and upon reviewing the associated drawings.

BRIEF DESCRIPTION OF THE DRAWINGS

FIG. 4 provides an isometric, partial cut-away view of the housing of FIGS. 2 and 3.

FIG. 5 provides an elevational, cross-sectional view of the housing in accordance with an alternative embodiment.

FIG. 5-1 provides an elevational, cross-sectional view of the housing in accordance with yet another alternative embodiment.

FIGS. 6–9 provide various alternative embodiments of an interior shaft capture arrangement used to secure shafts about which an actuator and/or a spindle motor of the device of FIG. 1 rotate.

FIG. 12 shows the feedthrough of FIG. 11 nested within the corresponding aperture in the base deck.

FIG. 13 illustrates an alternative embodiment for the feedthrough of FIG. 11 in which the feedthrough is formed using an injection-molding process.

FIGS. 16–18 illustrate the use of a swaging process to complete the formation of the feedthrough.

FIGS. 19–20 illustrate another embodiment in which multiple feedthroughs are initially affixed to an insertion member and the insertion member is then affixed over an aperture in the housing.

FIGS. 21–22 illustrate an alternative embodiment to that shown in FIGS. 19–20 in which differential pairs of the feedthroughs are isolated in glass discs within the insertion member.

DETAILED DESCRIPTION

Figure 1:
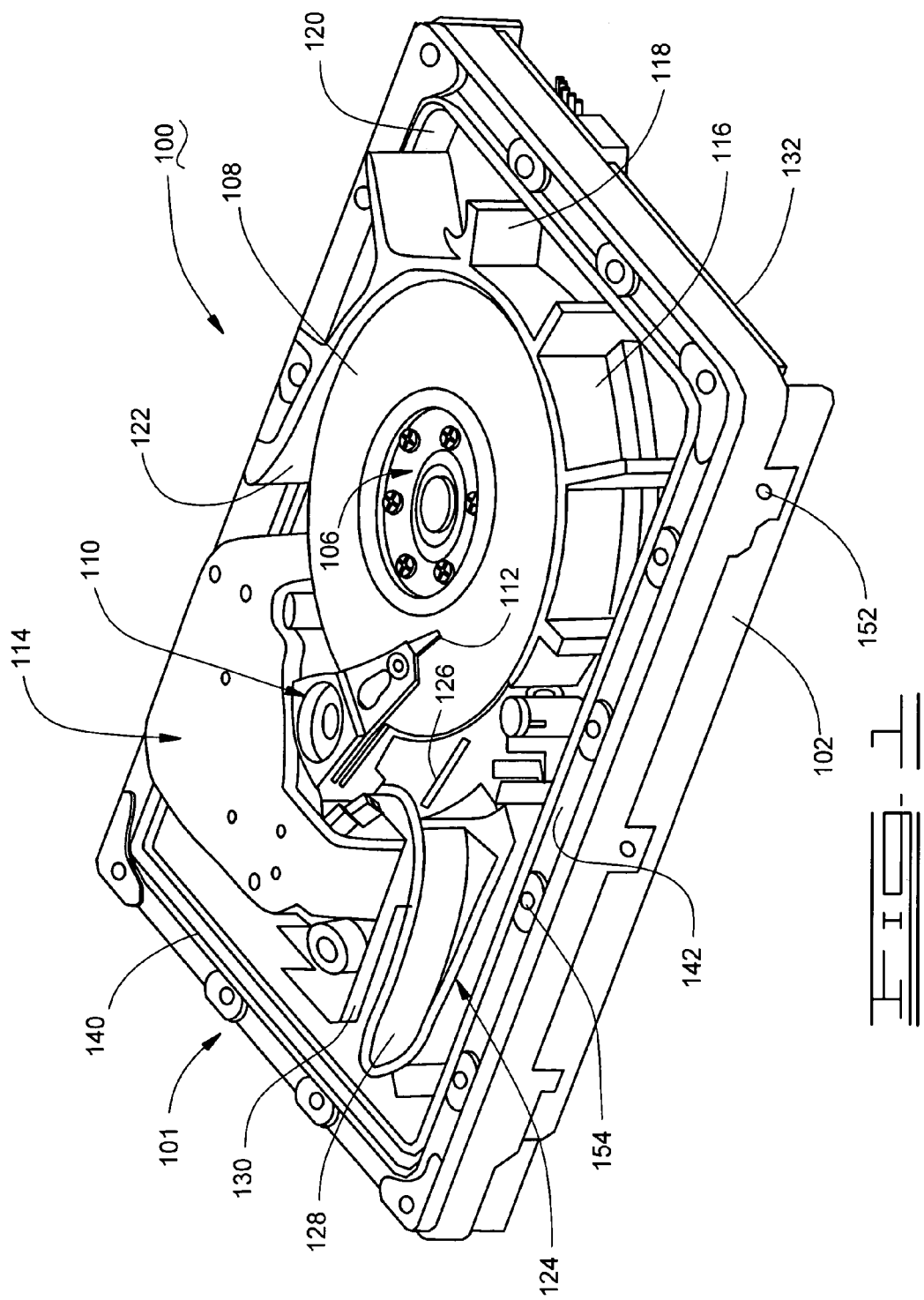
FIG. 1 is an isometric view of a data storage device constructed in accordance with preferred embodiments of the present invention, the device having a clamshell housing with a top cover which is removed in FIG. 1 to reveal an interior construction of the device.

FIG. 1 provides a top plan view of a data storage device constructed in accordance with preferred embodiments of the present invention. The data storage device is preferably characterized as a disc drive 100 of the type which magnetically stores and retrieves digital data from and to a host computer device.

Figure 2:
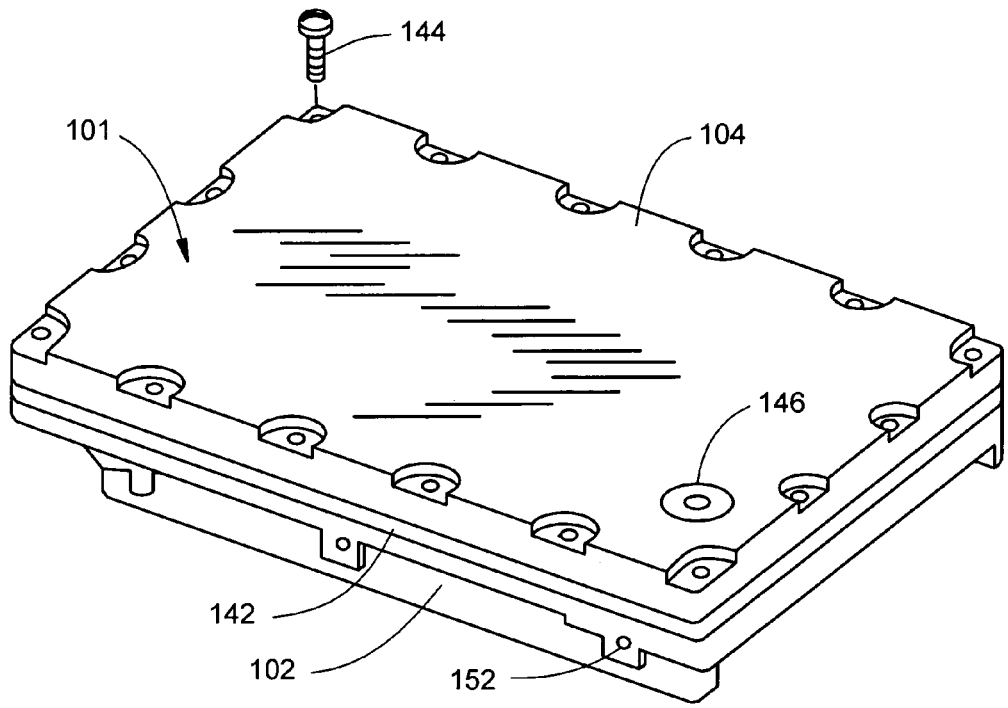
FIG. 2 provides an isometric view of the data storage device housing of FIG. 1 with the top cover in place.
Figure 3:
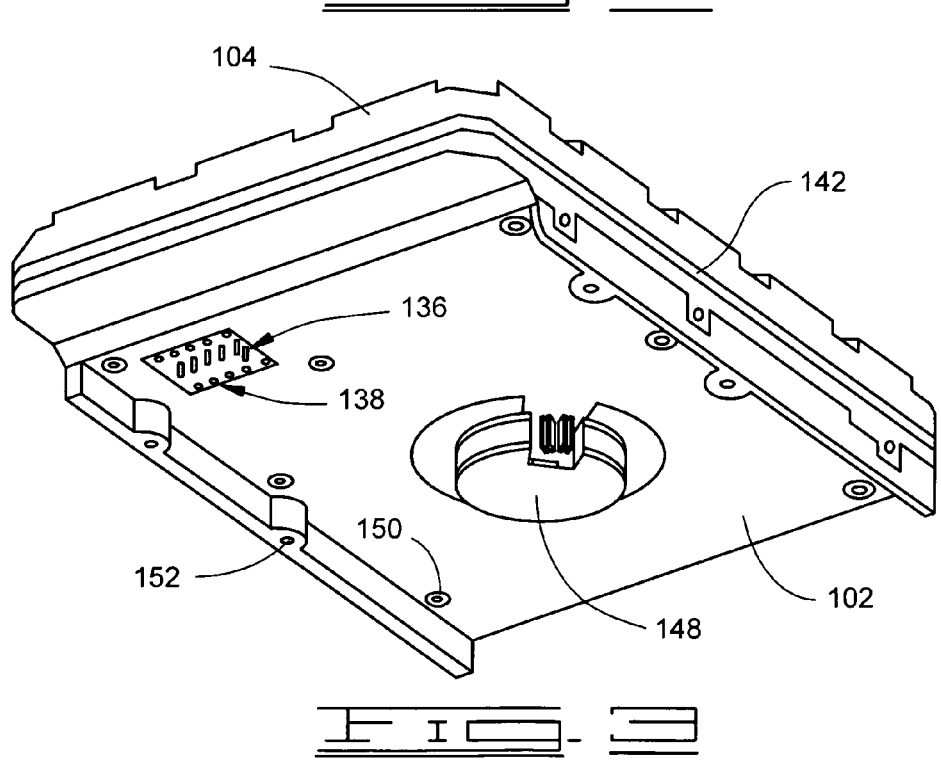
FIG. 3 provides another isometric view of the data storage device housing of FIGS. 1 and 2.

The disc drive 100 includes an enclosed housing 101 which defines an internal environment for the drive. The housing 101 is preferably characterized as a clamshell-type housing formed by a pair of substantially planar housing members including a base deck 102 and a top cover. The top cover has been removed in FIG. 1 to reveal the interior of the housing 101, but is shown at 104 in the isometric views of the housing provided in FIGS. 2 and 3.

The housing 101 is configured to establish a hermetic seal against the exterior environment outside the device 100. Preferably, the housing 101 is supplied with an inert fluidic atmosphere (e.g., helium) at a selected atmospheric pressure, such as standard atmospheric pressure, or pressures above or below standard atmospheric pressure. The hermetic seal established by the housing 101 is configured to nominally retain the internally contained fluid for the operational life of the device 100.

Continuing with FIG. 1, the base deck 102 supports a spindle motor 106 which rotates a plurality of data storage discs 108 at a constant high speed. A rotary actuator 110 supports a number of data transducing heads 112 adjacent the disc surfaces. The actuator 110 is rotated by an actuator motor 114, preferably characterized as a voice coil motor, VCM.

A shroud member 116 projects upwardly from the base deck 102 and partially surrounds the discs 108 to provide shrouding and containment of fluidic currents established by the rotation of the discs 108. The shroud member 116 includes radially projecting ribs 118 which serve to strengthen the shroud member 116, as well as allow a larger volume of fluid to be retained within the housing 101 in the space between the member 116 and a vertical sidewall 120 of the base deck 102.

A diverting surface 122 of the shroud 116 directs a portion of the recirculating fluidic currents from the discs 108 to the actuator motor 114 to convectively cool the motor. A plenum assembly 124 channels fluidic currents through a pass-through recirculation filter (housed within slot 126) and further accommodates a relatively large block of adsorbent filtering material (not shown) in recess 128.

A flex circuit assembly 130 provides electrical communication paths between the actuator 110 and a printed circuit board (PCB) 132. The PCB 132 is mounted to an exterior surface 134 (FIG. 3) of the base deck 102 and supports communication and control electronics for the device 100.

Individual feedthrough connectors (four represented at 136 in FIG. 3) are disposed within precisely sized apertures (represented at 138 in FIG. 3) in the base deck to accommodate electrical connection between the flex circuit assembly 130 and the PCB 132. Similar feedthrough connectors are provided to facilitate electrical interconnection between the spindle motor 106 and the PCB 132. For reference, it is contemplated that three (3) such feedthrough connectors are used for the spindle motor 106 and twenty-two (22) such connectors are used for the flex circuit assembly 130.

A compressive metal gasket seal 140 extends along the interior sidewall 120 of the base deck 102. An essentially non-compressive seal retention ring 142 preferably surrounds the seal 140 and is interposed between the base deck 102 and top cover 104. A plurality of fasteners (one shown at 144 in FIG. 2) are used to secure the base deck 102, top cover 104 and ring 142 together to complete the housing 101.

A purge/fill valve 146 extends into the top cover (FIG. 2) to allow evacuation of an existing volume of fluid (e.g., atmospheric air) and replacement with a new volume of fluid (e.g., helium). The valve 146 can be sealed by an internal mechanism or by the addition of an external seal using a conventional sealing process. A spindle motor boss 148 (FIG. 3) projects downwardly from the base deck 102 to provide clearance for the internally mounted spindle motor 106.

Threaded apertures (one shown at 150 in FIG. 3) accommodate hardware (not shown) used to mount the PCB 132 to the underside of the base deck 102. Similarly, threaded apertures 152 are provided to accommodate fasteners used to mount the device 100 in an operational environment.

Having now concluded an overview of the device 100, preferred embodiments of various aspects of the device will now be discussed in turn.

Housing Seal

As mentioned above, the housing 101 is contemplated as providing a nominally complete hermetic seal for the operational life of the device 100. To this end, the gasket seal 140 is preferably made of a suitable compliant material, such as dead soft aluminum, that improves sealing by filling in any residual surface roughness of the mating surfaces. The seal 140 can also include a thin coating layer (not separately shown) of a relatively soft metal such as lead, tin, gold, etc. to further enhance filling at the housing/seal junctions.

In one preferred configuration, the seal 140 has a hexagonal, "double-diamond" cross-sectional shape as depicted in FIGS. 4 and 5. A suitable commercial source for the double-diamond seal material shown in FIGS. 4 and 5 is EVAC International, Inc., Elk Grove Village, Ill., U.S.A.

The seal 140 can take alternative configurations as well, including a c-shaped cross-section as depicted in FIG. 5-1. A suitable commercial source for the c-shaped seal material shown in FIG. 5-1 is PerkinElmer, Inc., Hooksett, N.H., U.S.A.

The base deck 102, top cover 104 and the ring 142 are made of a material with substantially the same coefficient of thermal expansion (e.g., aluminum, aluminum alloy, etc.) as the seal 140. Preferably, the seal 140 contactingly nests within and is supported by the seal ring 142 as shown in FIGS. 5 and 5-1.

The number and spacing of the perimeter fasteners 144 (FIG. 2) are selected to provide a substantially even load upon the seal 140. The combination of residual elastic load in the metal seal and the matching coefficients of thermal expansion will enable the housing 101 to remain sufficiently hermetic through numerous thermal cycles within the non-operating and operating temperature ranges specified for the device 100.

The seal retention ring 142, also referred to as a compression limit spacer, is generally constructed to provide a compression limit for the seal 140. That is, as the fasteners 144 are torqued into place, the ring 142 limits the final compressive state of the seal 140 to a predetermined level. Machined bosses 154 (best viewed in FIG. 1) on the ring 142 are precisely dimensioned and distributed around the periphery of the housing 101 so as to surround the junctions between the top cover 104 and base deck 102. The use of the bosses 154 advantageously reduces the total surface area that needs be precisely machined to meet the compression limit dimensions.

The ring 142 can be provided with an overall thickness that is slightly less than the overall thickness of the gasket 140, as depicted in FIGS. 4 and 5-1, or the combined thickness of sidewalls of the top cover 104, base deck 102 and the retention ring 142 can be selected to be slightly less than the overall thickness of the gasket 140, as depicted in FIG. 5.

An advantage of the use of the removeable ring 142 is the ability to provide different sets of rings 142 and/or seals 140 with different overall thicknesses. This allows the use of the same seals 140 in different housing applications due to the different "spacer" dimensions of the different rings 142. Component matching and sorting can also be carried out as necessary to obtain appropriate seal/ring pairs based on tolerance requirements.

The removeable rings 142 also facilitates manufacturability of the device 100; for example, a "standard" thickness ring 142 can be installed initially into the device 100 during manufacturing. Should it be necessary to subsequently open the device 100, a second, thinner ring 142 can be installed that provides different, closer compression limit dimensions for the previously compressed seal 140. In this way, the original seal 140 can be reused in the same device 100 after the housing 101 has been opened. This can be valuable if the relative costs of the seal 140 and the "thinner" ring 142 make it more cost effective to reuse rather than replace the seal.

Actuator and Spindle Motor Shaft Support

Generally, it has been found desirable in some applications to provide top and bottom support of shafts used to support actuators and spindle motors (such as 110, 106 in FIG. 1). Supporting the shafts in this manner can reduce the generation of undesired vibrations during operation.

Previous generation devices have sometimes utilized fasteners that extend through apertures in the top cover to respectively secure stationary actuator and spindle motor shafts to the top cover. As will be recognized, such apertures represent possible leakage and contaminant entry paths.

Accordingly, preferred embodiments of the present invention utilize a top cover shaft capture arrangement, as variously illustrated in FIGS. 6–9. In accordance with a first embodiment, FIG. 6 provides a shaft 160 about which the actuator 110 (FIG. 1) or a rotatable hub of the spindle motor 106 can be configured to rotate. The shaft 160 has a substantially cylindrical outer surface 162 and a cone-shaped, tapered distal end 164.

A proximal end 165 of the shaft 160 is press-fit into an associated recess 166 in the base deck 102. The tapered distal end 164 engages a correspondingly tapered recess 168 in the top cover. The recess 168 is shaped to guide the end 164 into a distal recess point 169.

The top cover 104 is preferably made to be sufficiently compliant in this area so as to achieve the desired mechanical capturing of the shaft 160 between the respective base deck 102 and top cover 104. The nominally flat top cover 104 can thus be slightly bowed upwardly in the locality of the shaft 160 when the top cover 104 is installed, as generally represented by arrow 167.

FIG. 7 provides an alternative shaft 170 with a cylindrical outer surface 172 and a chamfered distal surface 174 that tapers to a planar surface 176. A generally cup-shaped recess 178 receives the distal end of the shaft 170. As shown in FIG. 8, the cup-shaped recess 178 can further be supplied with a layer of compliant material 180 that compresses upon insertion of the shaft 170 into the recess 178.

It is not necessarily required that the shaft be inserted into the top cover 102. Rather, as illustrated by FIG. 9, a shaft 190 can be provided with a recess 192 that accommodates insertion of a pin 194 that projects downwardly from the top cover 102. As before, a layer of compliant material (such as 180 in FIG. 8) can be additionally provided in the recess 192, or on the pin 194.

It will be noted that the embodiments represented by FIGS. 6–9 support the distal end of the shaft within the interior environment of the housing 101, unlike the prior art methodologies mentioned above wherein fasteners or other members project through the thickness of one or both housing members and thus present a potential leakage path. Moreover, the embodiments of FIGS. 6–9 are not limited to the top cover 104; rather, the same or similar methodologies can readily be used to affix the respective shafts to the base deck 102 as well, as desired.

Electrical Feedthroughs

Figure 10:
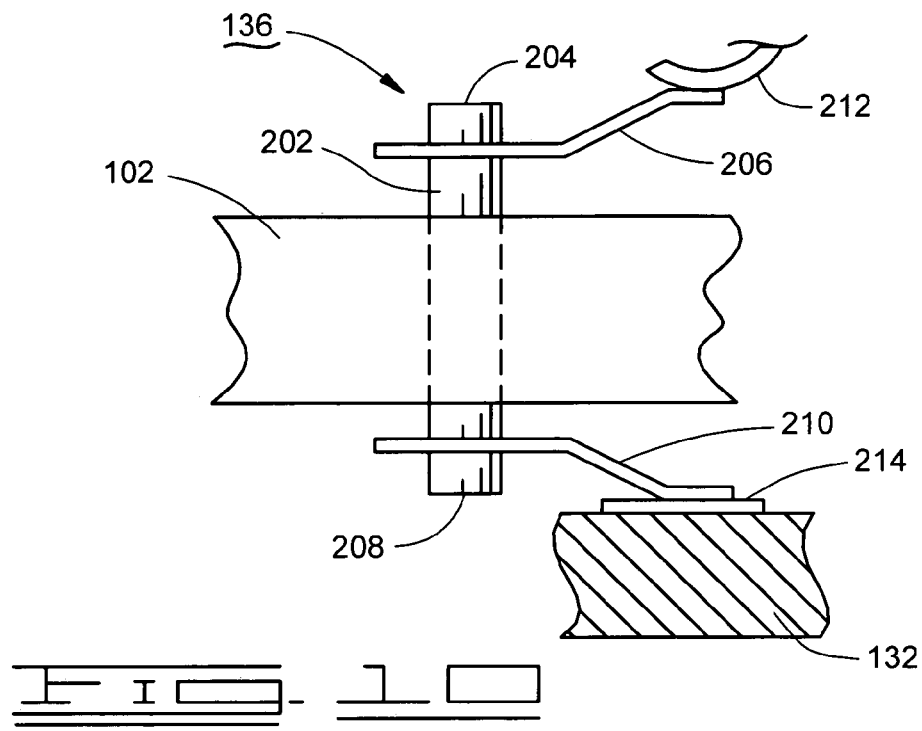
FIG. 10 is a schematic diagram of an electrical feedthrough used to provide an electrical conduction path from the interior of the housing to an exterior environment.

As mentioned above, the device 100 preferably utilizes a number of individual feedthrough connectors 136 ("feedthroughs") to allow electrical interconnection of the PCB 132 outside the housing 101 with the flex circuit assembly 130 and spindle motor 106 within the housing. A simplified schematic representation of one of the feedthroughs 136 is provided in FIG. 10.

Each feedthrough 136 preferably comprises a rigid, vertically extending conductive pin 202 which is supported by and electrically isolated from the base deck 102. A proximal end 204 of the pin 202 projects into the interior of the housing 101 and supports a cantilevered, leaf spring contact 206. A distal end 208 of the pin 202 projects beyond the exterior of the housing 101 and supports a second cantilevered, leaf spring contact 210.

The contacts 206, 210 are rigidly affixed to the pin 202, preferably via a press-fit, soldering or welding operation. The contacts 206, 210 each preferably project away from the base deck 102 as shown and facilitate the use of a compression contact connection. For example, the interior pin 206 is shown to pressingly engage a leaf spring contact 212 coupled to the flex circuit assembly 130. The exterior pin 210 pressingly engages a conductive pad 214 on the PCB 132. It will be understood that various other configurations for the cantilevered spring contacts 206, 210 and other engagement methodologies are readily contemplated and can be incorporated as desired depending upon the requirements of a given application.

Figure 11:
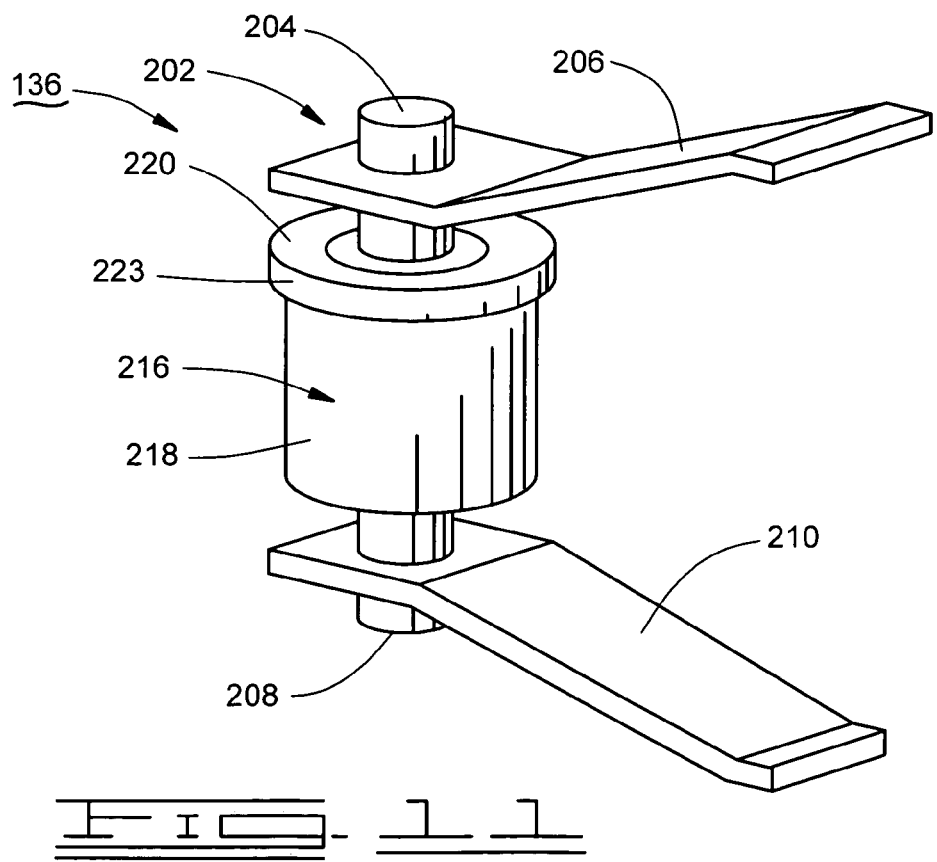
FIG. 11 provides an isometric view of the feedthrough in accordance with a preferred embodiment.

Various embodiments for the feedthroughs 136 will now be discussed. FIG. 11 shows a first version comprising a preformed insulation structure 216 affixed to a medial portion of the pin 202. As further shown in FIG. 12, the insulation structure 216 nests within the corresponding through-hole aperture 138 in the base deck and includes an outer cylindrical conductive tube 218 with a radially projecting hat flange 220.

An interior, insulating, low permeable glass layer 222 is disposed between the pin 202 and the tube 218. A soldering, brazing or welding operation is used to attach and hermetically seal the structure 216 over the aperture 138. A suitable commercial source for the structure 216 is Thunder-Z Corporation, Hampstead, N.H., U.S.A.

The hat flange 220 provides a suitable surface area to permit the attachment of the structure 216 to the base deck 102 such as, for example, by a welding or solder seam along outer surface 223. The hat flange 220 further advantageously acts as a limit stop; that is, the feedthrough 136 is inserted downwardly into the aperture 138 until the flange 220 comes to rest upon the top surface of the base deck 102. The spring contacts 206, 210 can be attached to the pin 202 prior to insertion, or can be attached after the structure 216 is affixed in the aperture 138.

It will be apparent that the configuration and orientation of the cantilevered leaf-spring contacts 206, 210 can be readily modified to permit easy insertion of the assembled feedthrough 136 through the confines of the aperture 138. For example, the contacts 206, 210 can be configured to be nominally oriented along the axial length of the pin 202 and thereafter be "folded-down" to the general orientation shown in FIGS. 10–12. Moreover, the contacts 206, 210 need not necessarily be discrete parts that are affixed to the pin 202; rather, in alternative embodiments the contacts can comprise tabs or similar extensions that project from the pin 202.

Another embodiment for the feedthroughs 136 is provided in FIG. 13. In this embodiment the individual pins 202 are initially held within the corresponding apertures 138 and then molded in-place using an injection-moldable, low permeable material 224 such as a suitable elastomer or polyimide. As before, the contacts 206, 210 are preferably part of the pins 202 or attached to the pins 202 prior to this molding step, but can alternatively be attached afterwards.

Figure 14:
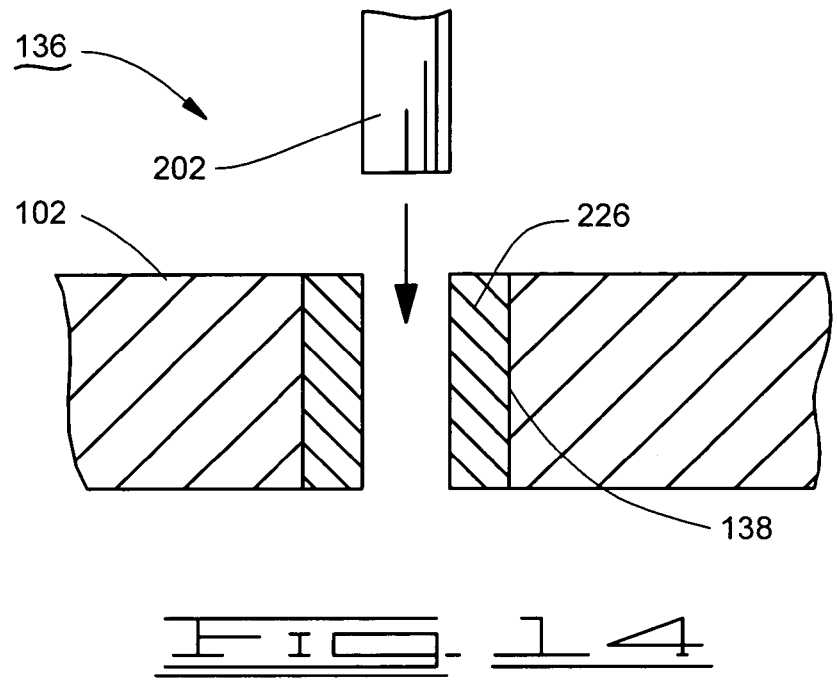
FIGS. 14 and 15 illustrate the use of thermal shrinking to insert a pin of the feedthrough into the base deck.
Figure 15:
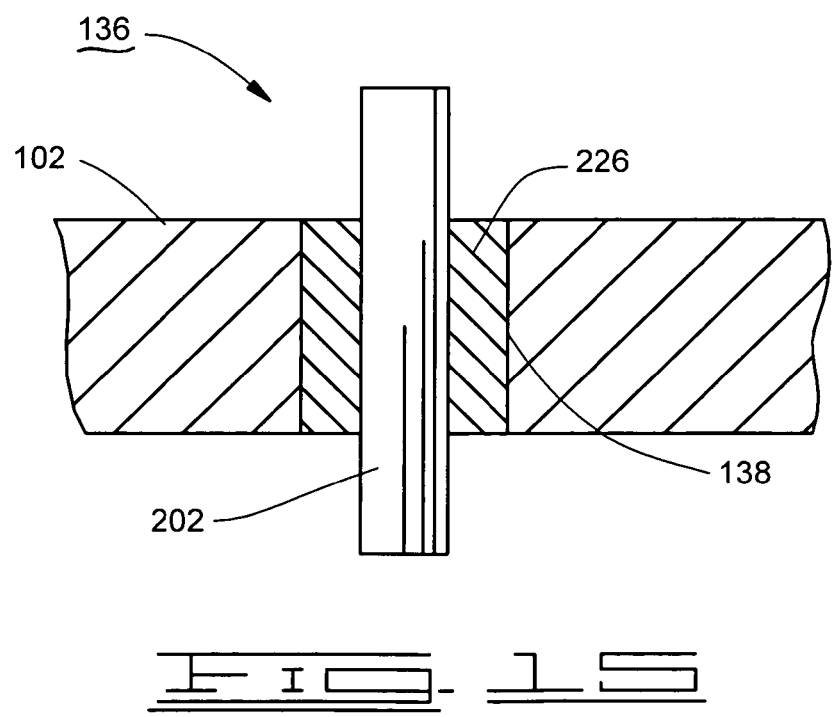

FIGS. 14 and 15 generally illustrate yet another embodiment for the feedthroughs 136. In this embodiment a ring of low permeable material 226 is molded or otherwise inserted into the aperture 138. The pin 202 (with or without the contacts 206, 210) is subjected to a significant decrease in temperature (utilizing a liquid nitrogen or similar heat sinking process) to temporarily, thermally shrink the dimensions of the pin 202 (as depicted in FIG. 14).

While in this thermally shrunk state, the pin 202 is inserted into the material 226 (as depicted in FIG. 15). As the pin 202 returns to ambient temperature, the outward expansion of the pin 202 forms a hermetic seal against the material 226.

The compositions of the pin 202 and material 226 should be matched so that the dimensional range of the pin 202 between the low temperature and ambient states can be accommodated structurally by the material 226, and that a suitable hermetic seal is obtained at the material/pin boundary at the conclusion of the thermal-shrink operation.

FIGS. 16–18 illustrate yet another embodiment for the feedthroughs 136. In this embodiment, a swaging operation is used to affix the feedthrough 136 into the aperture 138.

A ring of low permeable material 228 is molded or otherwise inserted into the aperture 138, as shown in FIG. 16. The pin 202 is configured as a hollow, cylindrical tube sized to nominally slide into the ring of material 228, FIG. 17. A swaging ball or similar member 230 is passed through the length of the tube to outwardly deform the pin 202 to form a hermetic seal at the material/pin boundary. The tube is then filled with solder 232 or other suitable material (FIG. 18) to complete the operation. As before, the contacts 206, 210 can be extensions of the pin 202 or separate parts that are affixed to the pin before or after the swaging operation.

The foregoing various embodiments of the feedthroughs 136 can be assembled directly into the base deck 102 (or top cover 104) to provide the requisite feedthrough array. In an alternative approach, the feedthroughs 136 are initially affixed through a separate insertion member, such as plate 234 shown in FIGS. 19–20, to provide a prefabricated feedthrough assembly 236. The feedthrough assembly 236 is then installed over an aperture 238 in the base deck 102 using a suitable attachment methodology, such as laser welding.

The feedthroughs 136 can be arranged into any suitable pattern, and can include adjacent pairs 240, 242 of the feedthroughs 134 for differential write and read signals.

FIGS. 21–22 provide an alternative embodiment for the feedthrough assembly 236 which embeds the adjacent pairs 240, 242 in an insulating member 244, such as a glass disk. This can improve performance of the differential pairs by removing undesired capacitance or other effects from the intervening layer of metal between the feedthroughs 136 shown in FIG. 19.

It will now be understood that the present invention (as embodied herein and as claimed below) is generally directed to a hermetically sealed housing, such as the type used in a data storage device.

Preferably, the housing (such as 101) is formed of opposing, substantially planar first and second housing members (such as 102, 104) coupled together to form a hermetically sealed interior environment. Means are provided for establishing individual electrical conduction paths through the first housing member.

The means for establishing the individual electrical conduction paths comprises an electrical feedthrough (such as 136) disposed within a corresponding aperture (such as 138) in the first housing member. The feedthrough includes an elongated electrically conductive pin (such as 202) having a proximal end (such as 204 which projects into the interior environment, a distal end (such as 208) which projects beyond the first housing member outside the interior environment, and a medial portion supported within the corresponding aperture in the first housing member.

A first cantilevered spring contact (such as 206, 210) projects from a selected one of the proximal and distal ends of the pin to establish a compression contact with a mating surface (such as 212, 214). Preferably, a second cantilevered spring contact (206, 210) projects from the remaining one of the proximal and distal ends of the pin.

The feedthrough further preferably comprises a ring of low permeable, insulative material (such as 222, 224, 226, 228) disposed within the aperture and which abuttingly surrounds the medial portion of the pin. The feedthrough is preferably affixed in the aperture using a variety of processes, including fusing, molding-in-place, thermal shrinking, and swaging. A feedthrough assembly (such as 236) incorporating one or more of the feedthroughs can also be provided and attached over an aperture (such as 238) in a selected housing member.

For purposes of the appended claims, the term hermetic will be understood consistent with the foregoing discussion to describe a sealing arrangement designed to have nominally no fluidic leakage or permeation paths.

The recited "means for establishing" will be understood consistent with the foregoing discussion to correspond to the various structures of the feedthrough 136 and apertures 138 disclosed in FIGS. 10–22, and requires both a rigid pin such as 202 and a cantilevered leaf spring such as 206, 210. Unitary bulkhead connectors that support a plurality of individual pins such as disclosed in U.S. Pat. No. 6,392,838 that do not include corresponding cantilevered leaf springs affixed to the pins are not encompassed within the scope of the element and are expressly excluded as an equivalent.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the housing without departing from the spirit and scope of the present invention.

In addition, although the embodiments described herein are directed to the hermetic sealing of a data storage device housing, it will be appreciated by those skilled in the art that the housing can be used for various other types of sealed enclosures without departing from the spirit and scope of the claimed invention.

What is claimed is:

1. A hermetically sealed housing comprising:
    opposing, substantially, planar first and second housing members coupled together to form a hermetically sealed interior environment; and
    means for establishing individual electrical conduction paths through the first housing member.

2. The housing of claim 1, wherein the means for establishing comprises an electrical feedthrough disposed within a corresponding aperture formed in the first housing member, the feedthrough comprising:
    an elongated electrically conductive pin having a proximal end which projects into the interior environment, a distal end which projects beyond the first housing member outside the interior environment, and a medial portion supported within the corresponding aperture in the first housing member; and
    a first cantilevered spring contact which projects from a selected one of the proximal and distal ends of the pin.

3. The housing of claim 2, wherein the feedthrough further comprises a second cantilevered spring contact which projects from the remaining one of the proximal and distal ends of the pin.

4. The housing of claim 2, wherein the feedthrough further comprises a ring of low permeable, insulative material disposed within the aperture and which which abuttingly surrounds the medial portion of the pin.

5. The housing of claim 4, wherein the feedthrough further comprises a ring of conductive material which abuttingly surrounds the ring of insulative material, wherein the ring of conductive material is attached to the first housing member to form a localized hermetic seal.

6. The housing of claim 4, wherein the pin is placed into the aperture and the ring of low permeable, insulative material is subsequently molded into the aperture to form the feedthrough.

7. The housing of claim 4, wherein the ring of low permeable, insulative material is placed within the aperture and the pin is subsequently inserted through the ring of low permeable, insulative material to form the feedthrough.

8. The housing of claim 7, wherein a temperature of the pin is reduced to thermally shrink the pin, the pin is inserted into the ring of low permeable, insulative material and the pin is allowed to expand to form a localized hermetic seal.

9. The housing of claim 2, wherein the pin is characterized as a hollow, cylindrical tube and wherein a swaging operation is used to affix the pin within the aperture in the first housing member.

10. The housing of claim 9, wherein the pin is subsequently filled with a low permeable material.

11. The housing of claim 10, wherein the low permeable material comprises solder.

12. The housing of claim 1, wherein the means for establishing comprises a feedthrough assembly comprising:
    an insertion member comprising a plate with a plurality of spaced apart apertures formed therethrough, the insertion member configured for attachment adjacent an aperture in the first housing member;
    a corresponding plurality of elongated electrically conductive pins each having a proximal end which projects into the interior environment, a distal end which projects beyond the first housing member outside the interior environment, and a medial portion supported within the corresponding aperture in the insertion member; and
    a corresponding plurality of first cantilevered spring contacts each of which projects from a selected one of the proximal and distal ends of each of the plurality of pins.

13. The housing of claim 12, wherein the insertion member is attached to the first housing member along an outer periphery of the insertion member and around the aperture in the first housing member to establish a hermetic seal between the feedthrough assembly and the first housing member.

14. The housing of claim 12, wherein the feedthrough assembly further comprises an insulating member through which extends an adjacent pair of the pins configured to transmit a differential signal, the insulating member in turn extending through the plate.

15. The housing of claim 1, wherein the housing is characterized as a housing of a data storage device which houses a data storage medium, and wherein the individual electrical conduction paths are configured to transmit signals used during operation of said medium.

16. The feedthrough of claim 15 in combination with an insertion member comprising a plate with a feedthrough aperture in which the medial portion of the pin is sealingly disposed to form a feedthrough assembly, the insertion member configured for attachment to the first housing member adjacent the central aperture in said housing member.

17. The feedthrough assembly of claim 16, further comprising an insulating member through which extends an adjacent pair of the pins to transmit a differential signal, the insulating member in turn extending through the plate.

18. An electrical feedthrough for use in a hermetically sealed housing to provide an electrical conduction path from a sealed interior of the housing to an exterior environment, comprising:
   an elongated electrically conductive pin having a proximal end configured to project into the interior environment, a distal end configured to project into the exterior environment, and a medial portion configured to be supported within a corresponding aperture in a first housing member; and
   a first cantilevered spring contact affixed to and which projects from a selected one of the proximal and distal ends of the pin.

19. The feedthrough of claim 18, further comprising a second cantilevered spring contact affixed to and which projects from the remaining one of the proximal and distal ends of the pin.

20. The feedthrough of claim 18, further comprising a ring of low permeable, insulative material which abuttingly surrounds the medial portion of the pin.

21. The feedthrough of claim 20, further comprising a ring of conductive material which abuttingly surrounds the ring of insulative material, wherein the ring of conductive material is attached to the first housing member to form a localized hermetic seal.

22. The feedthrough of claim 21, further comprising a hat flange that extends radially outwardly from the ring of conductive material.

23. The feedthrough of claim 18, wherein the pin is characterized as a hollow, cylindrical tube and wherein a swaging operation is used to affix the pin within the aperture in the first housing member.

24. A feedthrough assembly to establish a plurality of electrical connection paths through a hermetically sealed housing, comprising:
   an insertion member comprising a plate with a plurality of spaced apart apertures formed therethrough, the insertion member configured for attachment adjacent an aperture in a first housing member;
   a corresponding plurality of elongated electrically conductive pins each having a proximal end configured to project into an interior environment of the housing, a distal end which projects beyond the first housing member outside the interior environment, and a medial portion supported within the corresponding aperture in the insertion member; and
   a corresponding plurality of first cantilevered spring contacts each of which projects from a selected one of the proximal and distal ends of each of the plurality of pins.

25. The feedthrough assembly of claim 24, further comprising a corresponding plurality of second cantilevered spring contacts each of which projects from the remaining one of the proximal and distal ends of each of the plurality of pins.

26. The feedthrough assembly of claim 24, in combination with the first housing member, wherein the insertion member is welded to the first housing member along an outer periphery of the insertion member and around the aperture in the first housing member to establish a hermetic seal between the feedthrough assembly and the first housing member.

27. The feedthrough assembly of claim 24, further comprising an insulating member through which extends an adjacent pair of the pins configured to transmit a differential signal, the insulating member in turn extending through the plate.

* * * * *